April 8, 1941.

D. B. BAKER ET AL 2,237,921

ROLLER WHEEL

Filed Dec. 31, 1938

Inventors
David B. Baker
Clifford A. Rogers
William O. Bechman

By V. F. Lamagne
Atty.

Patented Apr. 8, 1941

2,237,921

UNITED STATES PATENT OFFICE 2,237,921

ROLLER WHEEL

David B. Baker, Riverside, Clifford R. Rogers, Oak Park, and William O. Bechman, Chicago, Ill., assignors to International Harvester Company, a corporation of New Jersey Application December 31, 1938, Serial No. 248,892

3 Claims. (Cl. 308—103)

This invention relates to a roller-wheel and more particularly to a construction which is adapted to be used in track rollers and idler wheels for crawler tractors.

In ordinary crawler tractor constructions, the tractor is provided with a pair of side track frames, each of which carries a plurality of small track rollers and a single front idler wheel about which the crawler track chain is trained, as is conventional. The construction of the track rollers and front idler wheels is an item of considerable importance because of the extreme conditions under which the tractor operates. Generally, the two most important aspects of such a roller wheel construction are simplicity and long life, the latter aspect involving lubrication and effective sealing of the parts against the escape of lubricant and the entrance of dirt and the like. It has been found that lubrication of these roller-wheels has been too frequently overlooked in the maintenance of the tractor. It is, therefore, desirable to provide means for containing a quantity of lubricant which serves to lubricate the roller through the action of the roller in rotating. A disadvantage encountered in providing hollow shafts to form lubricant reservoirs has been the resultant weakening of the shaft; and when the shaft is made of an increased diameter, the higher speeds thereby set up are found to decrease the efficiency and life of the sealing means.

The principal object of the present invention is the provision of a roller-wheel construction in which a roller or wheel is adapted to be carried on a transverse shaft which is provided with a central cylindrical bearing portion formed hollow to provide a lubricant reservoir for containing lubricant to lubricate the roller or wheel.

An important object is to provide the shaft with reduced end portions which may be associated with sealing means, the reduced diameter of the shaft facilitating the use of smaller seals and thus eliminating the detrimental effects of higher speeds caused by shafts of larger diameter.

Another important object is to provide a roller-wheel shaft in which the surface of the central portion provides a cylindrical bearing surface for mounting a roller-wheel thereon and in which the junctions between the reduced end portions and the central portion provide a pair of radial bearing surfaces which serve to accommodate the end thrust of the roller.

Another object is to provide sealing means, especially adapted to the particular shape of the shaft.

Another object is to provide the shaft in a manner making it simple to manufacture, the shaft comprising two substantially identical halves, forged and formed with the reservoir recess and then alined and welded together about the junction between the two enlarged portions forming the central cylindrical bearing portion.

Another object is the provision of a shaft in which a lubricant reservoir of substantial size is provided which extends substantially the axial length of the enlarged cylindrical bearing portion.

Still another object is to provide lubricant distributing openings in the cylindrical bearing portion and communicating with the end portions of the reservoir, the radial thrust bearing surfaces being closely spaced axially from respective openings whereby the lubricant may easily pass from the openings to the radial surfaces.

And still another object is to provide a lubricant passage in the shaft which may be utilized in supplying lubricant to the reservoir, and other openings which serve to distribute the lubricant over the cylindrical bearing surface.

Briefly and specifically, these and other desirable objects are achieved by the provision of a roller-wheel shaft which is made up of two substantially identical halves. Each half is preferably forged and is up-set at one end and is formed with an axially extending recess which is open toward the up-set end. The portion of the shaft axially at one side of the up-set portion is reduced with respect to the up-set portion and forms a cylinder of a diameter considerably less than the diameter of the cylinder formed by the other portion, the junction between the two cylinders forming a radial surface. Adequate openings are provided in the larger cylindrical wall and communicate with the recess. The outer end portion of the reduced portion is flattened in a plane parallel to the axis of the shaft. The two halves are butted together and welded about the junction between the two larger cylindrical portions, the annular recesses together forming a lubricant reservoir and the outer surface of said portion forming an outer cylindrical bearing surface on which the roller-wheel is rotatably carried.

The end thrust of the roller-wheel is taken by thrust means associated with respective portions of the roller-wheel and the radial bearing faces. Sealing means are disposed about the reduced portion and cooperate with cylindrical portions of the roller-wheel and shaft inwardly of the pair of spaced supports in which the shaft is mounted.

A further understanding of the desirable features of the invention may be had from the following detailed description of a preferred form of the invention taken in conjunction with the accompanying sheet of drawings, in which.

Figure 1:
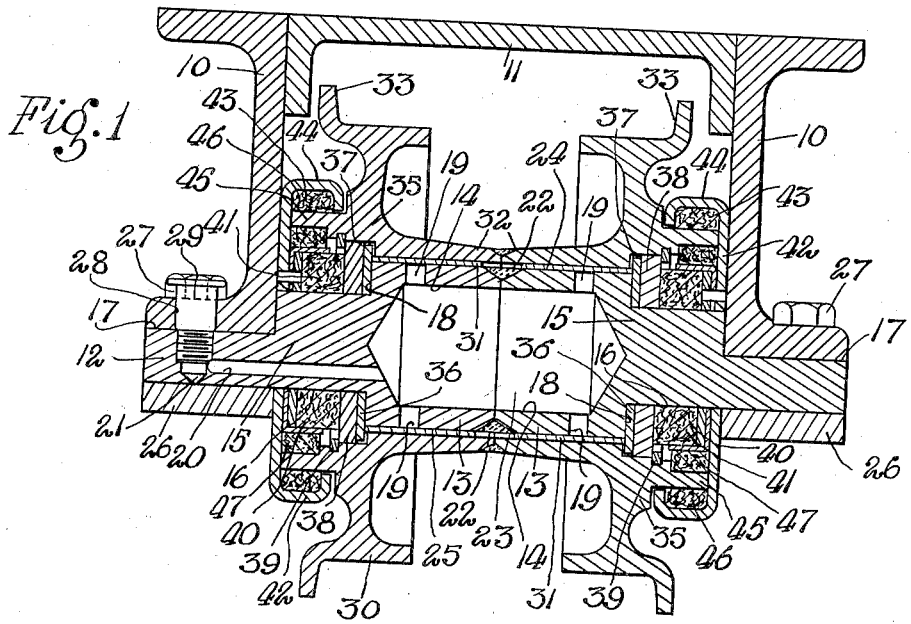
Figure 1 is a transverse sectional view showing the improved roller-wheel construction mounted in position in a side track frame of a crawler tractor.
Figure 2:
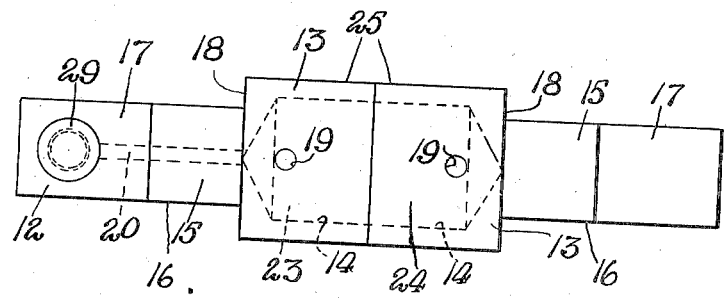
Figure 2 is a detailed elevational view of the improved shaft per se.
Figure 3:
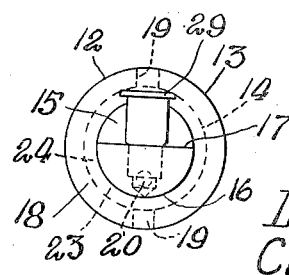
Figure 3 is an end elevational view of the same.

A side track frame of a crawler tractor is shown in section and comprises generally a pair of spaced supports in the form of channel frame members 10 crossconnected by a channel member 11. A shaft 12 is mounted between the channel members 10 and is carried thereby.

The shaft 12 is preferably formed by forging and is made up of two substantially identical halves. Each half is formed by up-setting the shaft part at one end to form an enlarged cylindrical portion 13 which in turn is formed with an axially extending recess or hollowed portion 14 which is open at the up-set end and is preferably cylindrical.

A portion of the shaft axially at one side of the enlarged cylindrical portion 13 is reduced and forms a second cylindrical portion 15 having a lesser diameter than the portion 13. The cylinder portion 15 is finished at its outer surface to provide a cylindrical surface 16. The portion 15 at its outer end is further fabricated by being flattened as at 17 along a plane parallel to a plane passed through the axis of the shaft part. The junction between the cylindrical portion 13 and the cylindrical portion 15 provides a radial surface 18. A plurality of openings 19 is formed in the cylindrical wall of the portion 13 and communicate with the recess 14. One of the halves is further formed with a substantially axially extending passage or conduit 20 which communicates at one end with the recess 14 and at its other end with a bore 21. The two shaft parts are butted together along the radial faces formed at the inner ends of the enlarged cylindrical portions 13, and being thus alined are welded together as at 22 about the peripheral junction of the parts.

The two recesses 14 together form a lubricant reservoir 23 within an intermediate central cylindrical portion 24 of the shaft formed by the alinement of the two cylindrical portions 13, the outer cylindrical surface being finished to provide a cylindrical bearing surface 25. In this manner, the shaft 12 is formed with the comparatively wide, central cylindrical bearing portion 24 which is hollow, as previously described, to form the lubricant reservoir 23 which, in the present preferred form of the invention, extends axially of the shaft a distance substantially equal to the axial extent of the bearing surface 25. Certain of the openings or bores 19 are thus disposed in axially spaced relation, each being situated at an end portion of the reservoir 23 and closely spaced axially from the respective radial faces 18. The flattened end portions 17 of the shaft 12 fit the flat under surface of the channel members 10 and the shaft is fixedly mounted in the side frame members by means of brackets 26 and bolts 27. One channel member 10 is provided with a bore 28 which becomes alined with the bore 21 formed in the one shaft part and a lubricant fitting 29 is passed through the bore 28 and threaded into the bore 21, through which fitting lubricant may be supplied to the lubricant reservoir 23 by means of the lubricant passage or conduit 20. When the lubricant reservoir is filled, lubricant is distributed through the openings 19 over the cylindrical bearing surface 25 and over the radial surfaces 18, the latter surfaces being readily supplied because of their location in close proximity to the openings.

A roller-wheel element 30 is rotatably carried on the central cylindrical portion 24 and a pair of axially related bushings 31 are disposed between the bearing surfaces 25 of the shaft and a central hub portion 32 of the roller-wheel. The roller-wheel illustrated is one of the track roller type comprising part of a side frame assembly, and it will be understood that the same or similar construction may be utilized in the front idler or other wheels. Each roller 30 is preferably formed of two halves welded together along the peripheral junction between the two parts at the central hub portion 32. The outer cylindrical portion of the roller-wheel is formed with a pair of axially spaced radial flanges 33 between which the track chain is carried in the usual manner.

A pair of thrust means 35 is provided between opposite end portions of the roller-wheel and the respective radial faces 18 for taking the end thrust of the roller-wheel. Each thrust means comprises a bronze washer 36 which thrusts against a radial face 18, the washers being respectively disposed within annular recesses 37 formed at outer end portions of the roller-wheel 30. Each thrust means 35 further includes a steel washer 38 bearing against the bronze washer 36 and, like said washer, surrounding the cylindrical bearing surface 16 formed on the reduced end portion 15 of the shaft 12. A snap ring 39 is fitted in the roller-wheel in the vicinity of the respective recess 37 and confines the washers 36 and 38 in place.

Each annular recess 37 is continued axially outwardly toward the respective support 10 and contains a sealing means 40 for preventing the escape of lubricant and the entrance of dirt and the like. Each sealing means 40 comprises a sealing element 41 surrounding the reduced cylindrical portion 15 of the shaft and abutting the outer radial face of the thrust washer 38, the outer radial face of the seal abutting the inner radial face of a washer or ring 42 comprising also a portion of a second sealing means 43. The washer 42 extends radially from the shaft 12, its outer radial face abutting the inner face of the respective channel member 10 to close the end of the roller-wheel, and is formed with an annular portion 44 encircling a cylindrical end portion 45 formed in the outer end of the roller-wheel about the annular recess 37 and the continuation thereof which encloses the sealing means 40. The annular portion 44 contains a sealing element 46 which comprises another portion of the sealing means 43, this element surrounding the cylindrical end portion 45 of the roller wheel 30. A third sealing means 47 is disposed between the two sealing means 40 and 43 and comprises a sealing element surrounding the sealing means 40 and fitting within the outer extended portion of the annular recess 37 within the cylindrical end portion 45 of the roller 30, the outer radial face of said element abutting the inner radial face of the washer 42.

The entire roller wheel assembly may be installed in and removed from the track frame as a unit, being quickly mounted or dismounted therefrom by the convenient brackets 26 and bolts 27. In the operation of the roller-wheel construction, lubricant is supplied through the lubricant fitting 29 and through the lubricant passage 20 to the reservoir 23, from whence it is distributed through the openings 19 over the cylindrical bearing surface 25 and over the radial bearing faces 18 which serve to take the end thrust of the roller-wheel 30 through the thrust means 35. Since the diameter of the cylindrical portions 15 is considerably less than the diameter of the cylindrical portion 24, smaller seals may be used and higher speeds which would be set up by larger seals (necessitated by the use of a larger diameter shaft) are eliminated, thus increasing the efficiency and life of the seals. At the same time, the central bearing portion 24 is made sufficiently wide to properly carry the roller-wheel 30 and of a sufficient diameter to enclose the adequate lubricant reservoir 23 which contains sufficient lubricant to lubricate the roller-wheel over a substantially prolonged period of time, thus eliminating frequent lubricating of the roller-wheels such as are necessitated by shafts having no or small reservoirs.

Thus, it will be seen that an improved roller-wheel construction has been provided incorporating features directed toward the attainment of the aforesaid objects and other objects which will be readily apparent to those skilled in the art. It will be understood, of course, that only a preferred form of the invention has been illustrated and described and that numerous modifications and alterations may be made in the preferred construction without departing from the spirit and scope of the appended claims.

What is claimed is:

1. A roller-wheel shaft comprising substantially identical halves, each formed with an enlarged cylindrical end portion formed with an axially extending, cylindrical recess, its cylindrical wall having an opening therethrough communicating with the recess, each half being further formed with a coaxial reduced, cylindrical end portion having a diameter smaller than that of the cylindrical recess, the junction between the reduced portion and the enlarged portion providing a radial face, said halves being welded together about the circumference of the junction between the two enlarged portions to form a unitary shaft, the recesses together forming a lubricant reservoir and the outer cylindrical surfaces of the enlarged portions forming a cylindrical bearing surface.

2. A roller-wheel construction comprising, in combination with a pair of spaced supports, a transverse shaft carried at its opposite ends by the supports and having an intermediate cylindrical portion and coaxial, reduced cylindrical portions respectively at each side thereof and inwardly of the supports, a roller-wheel rotatably carried on the intermediate shaft portion and having opposite cylindrical end portions in close proximity to the supports, each end portion being formed with an axially inwardly extending cylindrical recess substantially encircling the respective reduced shaft portion, a pair of lubricant seals respectively surrounding the reduced shaft portions within the roller-wheel recesses, a second pair of seals respectively surrounding the first seals in the recess, and a third pair of seals respectively surrounding the aforesaid roller-wheel cylindrical portions and contacting the supports for substantially closing the roller-wheel ends, the respective seals of each pair lying generally concentric and in the same plane.

3. A roller-wheel construction comprising, in combination with a pair of spaced supports, a transverse shaft carried at its opposite ends by the supports and having an intermediate cylindrical portion and coaxial, reduced cylindrical portions respectively at each side thereof and inwardly of the supports, a roller-wheel rotatably carried on the intermediate shaft portion and having opposite cylindrical end portions in close proximity to the supports, each end portion being formed with an axially inwardly extending cylindrical recess substantially encircling the respective reduced shaft portion, a plurality of concentrically disposed lubricant seals arranged respectively at opposite ends of the shaft inwardly of the supports, two seals at each end being disposed within the roller-wheel recess and a third seal surrounding the roller-wheel end portion, and a pair of circular plate elements fitting the reduced shaft portions and having flat radial portions respectively contacting the supports to close the roller-wheel ends, each element including an annular flanged portion embracing an aforesaid third seal.

DAVID B. BAKER.
CLIFFORD R. ROGERS.
WILLIAM O. BECHMAN.